US008078521B1

(12) United States Patent
Williams et al.

(10) Patent No.: US 8,078,521 B1
(45) Date of Patent: Dec. 13, 2011

(54) SYSTEMS AND METHODS FOR CREDIT DEFAULT SWAP AUCTION

(75) Inventors: John Williams, New York, NY (US);
Doug Warren, Brooklyn, NY (US);
Bryce Markus, New York, NY (US);
David Moss, Brooklyn, NY (US);
Robert Lee, Summit, NJ (US);
Carlo-Edoardo Carlon, London (GB);
Athanassios Diplas, Chatham, NJ (US);
Glade Jacobsen, New York, NY (US);
Justin Gmelich, New York, NY (US);
William Roberts, New York, NY (US);
Bryan Mix, Tuxedo Park, NY (US);
Kimberly Summe, New York, NY (US);
Tom Benison, Greenwich, CT (US);
Alessandro Cocco, New York, NY (US);
Lisa Watkinson, New York, NY (US);
Thomas Vogel, New York, NY (US);
Vincent Basulto, New York, NY (US)

(73) Assignee: International Swaps and Derivatives Association, Inc., New York, NY (US)

( * ) Notice: Subject to any disclaimer, the term of this patent is extended or adjusted under 35 U.S.C. 154(b) by 832 days.

(21) Appl. No.: 11/830,005

(22) Filed: Jul. 30, 2007

Related U.S. Application Data

(60) Provisional application No. 60/834,654, filed on Aug. 1, 2006.

(51) Int. Cl.
*G06Q 40/00* (2006.01)
(52) U.S. Cl. .......................................... 705/37

(58) Field of Classification Search .................. None
See application file for complete search history.

(56) References Cited

U.S. PATENT DOCUMENTS

| 7,647,264 B2 * | 1/2010 | Hatheway et al. | 705/36 R |
| 2002/0077947 A1 * | 6/2002 | Ward et al. | 705/36 |
| 2007/0239576 A1 * | 10/2007 | Hirani et al. | 705/35 |

OTHER PUBLICATIONS

Anonymous; FERC Orders SPP to Refile Market Plan; Megawatt Daily; Arlington; Mar. 17, 2006; vol. 11, Iss. 52, p. 1.*
Hanley, William; Broomfield, Patrick; and Horvitch, Sonita; Liquidity and the $2 Trader: Making a Market Series; Investing Guide; National Post, Don Mills, Ont.; Oct. 23, 2002, p. 6.*
Leleux, Benoit, Francois; Essays on French Capital Market. Risk Arbitrage in Tender Offer, Value Creation by Holdings, and IPO Mechanism Selection Process; Ph.D., INSEAD (France and Singapore); 1995, 115 pages; AAT 9527063 (abstract).*
Credit default swap from Wikipedia, downloaded from the Internet from http://en.wikipedia.org/w/index.php?title=Credit_default_swap, on Mar. 23, 2007.
Nishul Saperia, Markit, "Guide to Credit Event Auctions," LTSA Loan Market Chronicle 2007, pp. 61-71.

* cited by examiner

*Primary Examiner* — Alexander Kalinowski
*Assistant Examiner* — Virpi Kanervo
(74) *Attorney, Agent, or Firm* — Crowell & Moring LLP (57) ABSTRACT

Systems and methods for settling credit default swap contracts upon occurrence of a credit event are provided. In the first stage an inside market price and imbalance between net sell and buy positions are determined. When there is an imbalance between net sell and buy positions, a second stage is employed to determine a final price for settling the imbalance.

15 Claims, 11 Drawing Sheets

|  | Bid | Offer |
|---|---|---|
| Participant A | 39.500% | 41.000% |
| Participant B | 40.000% | 42.000% |
| Participant C | 41.000% | 43.000% |
| Participant D | 45.000% | 47.000% |
| Participant E | 32.000% | 34.000% |
| Participant F | 38.750% | 40.000% |
| Participant G | 38.000% | 39.500% |
| Participant H | 41.000% | 42.750% |

} Matched Markets

FIGURE 4A

|  | Bid | Offer |  |
|---|---|---|---|
| Participant D | 45.000% | 34.000% | Participant E |
| Participant C | 41.000% | 39.500% | Participant G |
| Participant H | 41.000% | 40.000% | Participant F |
| Participant B | 40.000% | 41.000% | Participant A |
| Participant A | 39.500% | 42.000% | Participant B |
| Participant F | 38.750% | 42.750% | Participant H |
| Participant G | 38.000% | 43.000% | Participant C |
| Participant E | 32.000% | 47.000% | Participant D |

Tradable Markets (top 3 rows)

Best Half (middle 3 rows)

FIGURE 4B

| Best Half | |
|---|---|
| Inside Market Bids | Inside Market Offers |
| 40.000% | 41.000% |
| 39.500% | 42.000% |
| 38.750% | 42.750% |

Inside Market Midpoint = Average (40, 41, 39.5, 42, 38.75, 42.75) = 40.667%, rounded to 40.625%

FIGURE 4C

| Inside Market Bids | Inside Market Midpoint | Adjustment Amount (as a percentage of the Inside Market Quotation Amount) |
|---|---|---|
| 45.000% | 40.625% | 5.375% |
| 41.000% | 40.625% | 0.375% |
| 41.000% | 40.625% | 0.375% |

FIGURE 5A

| Inside Market Midpoint | Inside Market Offers | Adjustment Amount (as a percentage of the Inside Market Quotation Amount) |
|---|---|---|
| 40.625% | 34.000 % | 6.625 % |
| 40.625% | 39.500% | 1.125% |
| 40.625% | 40.000% | 0.625% |

FIGURE 5B

|  | Bid | Quotation Size | Open Interest Matched |
|---|---|---|---|
| Participant D | 45.000% | 10 | 10 |
| Participant C | 41.000% | 10 | 10 |
| Participant H | 41.000% | 10 | 10 |
| Participant B | 40.000% | 20 | 20 |
| Participant A | 39.500% | 10 | 10 |
| Participant F | 38.750% | 2 | 2 |
| Participant G | 35% | 10 | 6.5 |
| Participant E | 35% | 10 | 6.5 |

FIGURE 6

SYSTEMS AND METHODS FOR CREDIT DEFAULT SWAP AUCTION

The present application claims priority under 35 U.S.C. §119 to U.S. Provisional Application No. 60/834,654, filed Aug. 1, 2006, the entire disclosure of which is herein expressly incorporated by reference.

BACKGROUND OF THE INVENTION

Exemplary embodiments of the present invention are directed to credit default swap contracts (CDS). Credit default swap contracts involve one party (referred to as the protection buyer) buying protection from another party (referred to as the protection seller) in case of a credit event, such as the issuer of the debt instrument declaring bankruptcy, failing to pay an amount due on a debt instrument or restructuring a debt instrument. When a credit event occurs, the contract requires the protection seller to make a payment to the protection buyer in the course of physical or cash settlement of the credit default swap.

Physical settlement involves a protection buyer delivering one or more debt instruments to the protection seller, and the protection seller paying the protection buyer the face value of each debt instrument delivered. The protection seller can then proceed to collect on the debt instrument from the issuer of the debt instrument for an amount referred to as the recovery value of the debt instrument, which has likely been diminished due to the credit event. For example, assume that after a credit event occurs the recovery value of the debt instrument is 70% of its face value (i.e., there is a 70 cents on the dollar recovery rate). The protection seller pays the protection buyer 100 cents on the dollar (i.e., face value of the debt instrument), and the protection buyer physically delivers the debt instrument. The protection seller can then collect the 70 cents on the dollar recovery value from the issuer of the debt instrument or the issuer's successor-in-interest. Alternatively, the protection seller can attempt to sell the debt instrument in the open market.

Cash settlement involves the protection seller paying the difference between the expected recovery value and face value of the debt instrument to the protection buyer. If the protection buyer owns the debt instrument, the protection buyer can then proceed to collect from the debt instrument issuer for the recovery value of the debt instrument. Assuming, that the expected recovery value of the debt instrument is 70% of its face value (i.e., a 70 cents on the dollar recovery rate), the protection seller pays the protection buyer 30 cents on the dollar, and the protection buyer does not hand-over the debt instrument, but instead proceeds to collect the recovery value (i.e., the remaining 70 cents on the dollar if the actual recovery value is equal to the expected recovery value) from the debt issuer or the issuer's successor-in-interest. Alternatively, the protection buyer can attempt to sell the debt instrument in the open market.

SUMMARY OF THE INVENTION

The popularity of credit derivatives has made physical settlement very complicated due to the large imbalance between the notional outstanding of credit default swaps contracts and the underlying debt instruments. This imbalance is caused by protection buyers who do not actually hold a nominal amount of the instrument equal to the amount of protection purchased. For example, a protection buyer, who does not actually hold the debt instrument, can buy protection on the debt instrument from a protection seller. Accordingly, when a credit event occurs, this protection buyer must purchase the relevant nominal amount of the debt instrument in order to physically settle the credit default swap contract. This can cause a run-up in the price of the underlying debt instrument as protection buyers must purchase the underlying debt instrument in order to deliver the instrument to the protection seller. In addition, if a third party holds a significant amount of the debt instrument, it may not be possible for a protection buyer to locate and purchase the relevant nominal amount of the debt instrument in the open market.

Moreover, the imbalance also causes problems for physical settlement by parties acting as both protection buyers and protection sellers in a debt instrument. For example, a first party may be a protection buyer with respect to a second party and a protection seller with respect to a third party. When the first party's position is as a net protection buyer (i.e., more protection is purchased than is sold) or when the first party does not hold any of the debt instrument, if the first party had to deliver debt instruments to the second party before being able to obtain debt instruments from the third party, the first party would have to purchase debt instruments on the open market. Due to the run-up in price of the underlying debt instrument discussed above, the first party may have to purchase the underlying debt instrument at an inflated price in order to physically settle with the second party.

Although some parties to credit default swap contracts prefer cash settlement, there has not been an efficient mechanism to determine the expected recovery value (i.e., the recovery rate) for the debt instrument. One valuation technique that has been attempted is for the protection buyer to poll a number of dealers for a recovery rate, and then submit that recovery rate to the protection seller. This technique, however, is open to manipulation by dealers because these dealers are not contractually obligated to actually purchase the debt instruments at this price. Accordingly, this amount may not reflect the actual recovery rate that should be accorded to the debt instrument. Therefore, credit default swap contracts have generally involved only physical settlement.

Exemplary embodiments of the present invention overcome the above-identified and other deficiencies of settling credit default swap contracts. In accordance with exemplary embodiments of the present invention, a two stage process is provided. The first stage determines an inside market midpoint and the second stage determines a final price for settling imbalances between buy and sell orders from the first stage. In the first stage, participants submit inside market orders, that include a price and are for a pre-determined quantity, and/or market orders/requests for physical settlement, which specify a quantity but not a price. The inside market midpoint can be calculated using the inside market orders. In the second stage, limit orders, which specify a price and a quantity, are received, which are used to calculate the final price. All orders for the second stage are settled at the final price.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
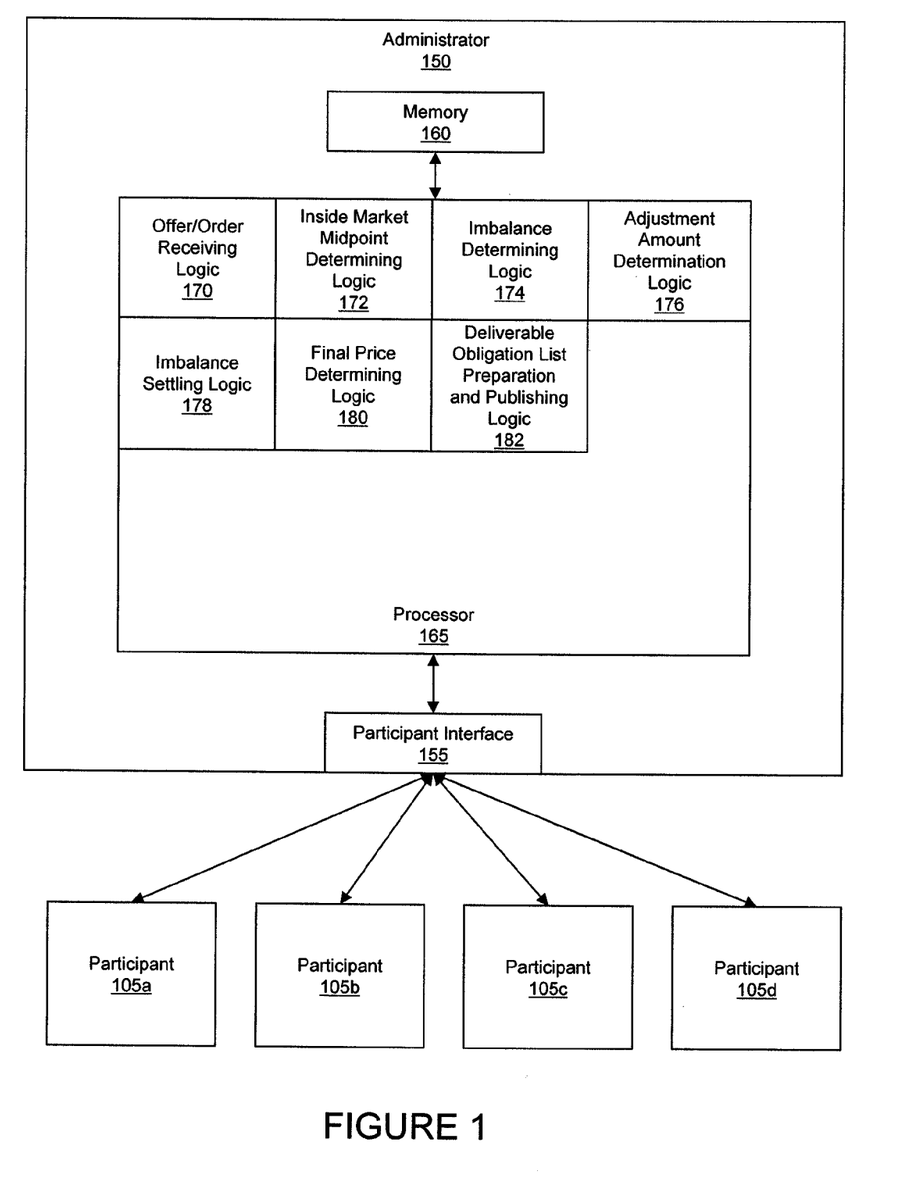
FIG. 1 is a block diagram of an exemplary system in accordance with the present invention.

FIG. 1 is a block diagram of an exemplary system in accordance with the present invention. The system includes a number of participants 105a-105d and an administrator 150. One or more of the participants can be, for example, a computer, telephone, or a human participant operating a computer and/or telephone. These participants can be broker/dealers acting on their own behalf and/or acting on behalf of other persons, such as their customers.

Administrator 150 includes a participant interface 155, memory 160 and processor 165. Participant interface 155 can be any type of interface that is suitable for interacting with participants 105a-105d. For ease of explanation, and not limitation, the central entity is described as a single administrator 150, however, the administrator can be more than one entity. For example, various functions and processes can be divided between a trade organization such as the International Swaps and Derivatives Association, Inc. (ISDA) and an auction administrator.

Processor 165 includes logic 170-182, which will be described in more detail below in connection with FIGS. 2 and 3. Processor 165 can be any type of processor, such as a microprocessor, field programmable gate array (FPGA) and/or an application specific integrated circuit (ASIC). When processor 165 is a microprocessor then logic 170-182 can be processor-executable code loaded from memory 160.

Figure 2A:
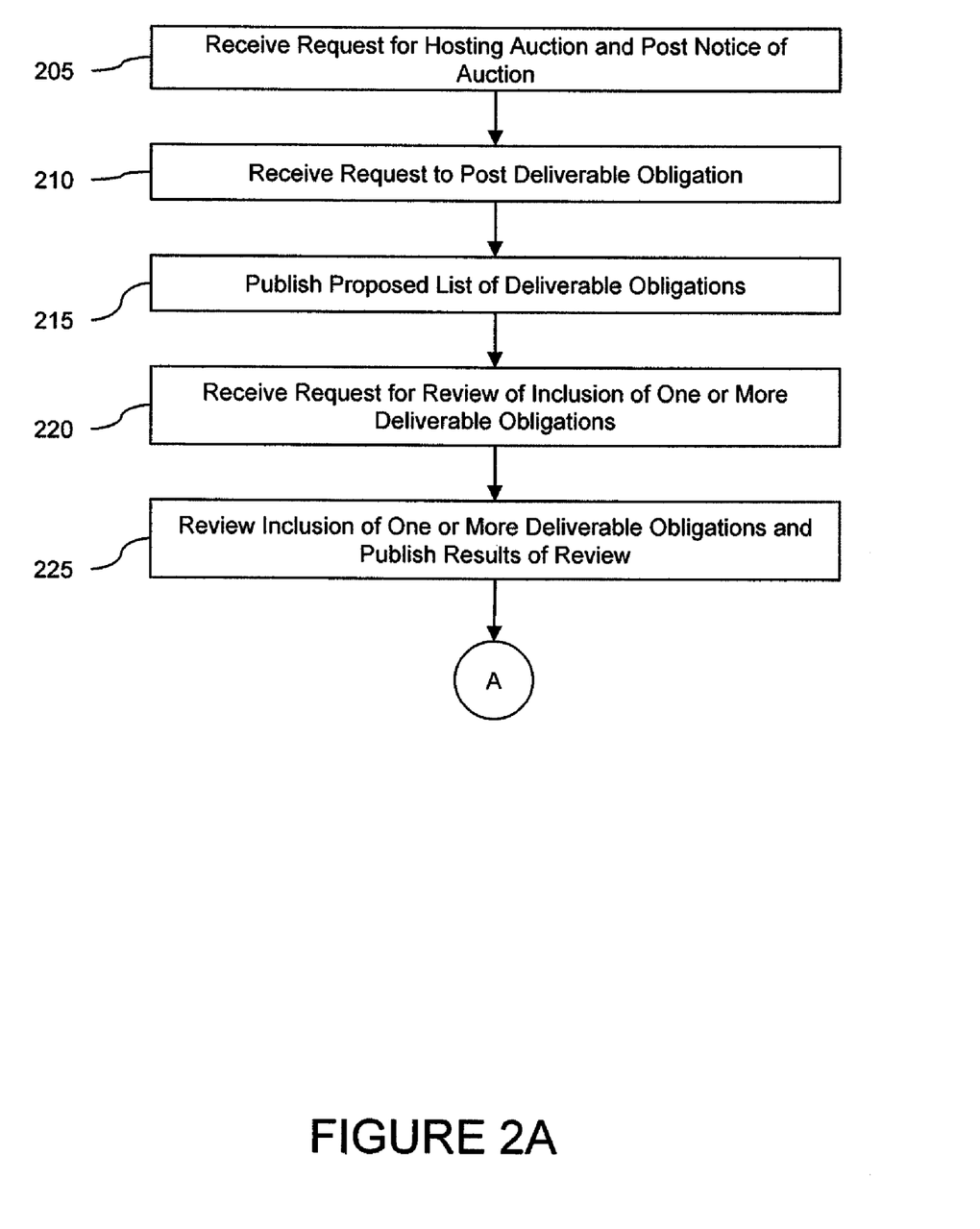
FIGS. 2A and 2B are flow diagrams of an exemplary method for selecting deliverable obligations for an auction in accordance with the present invention.
Figure 2B:
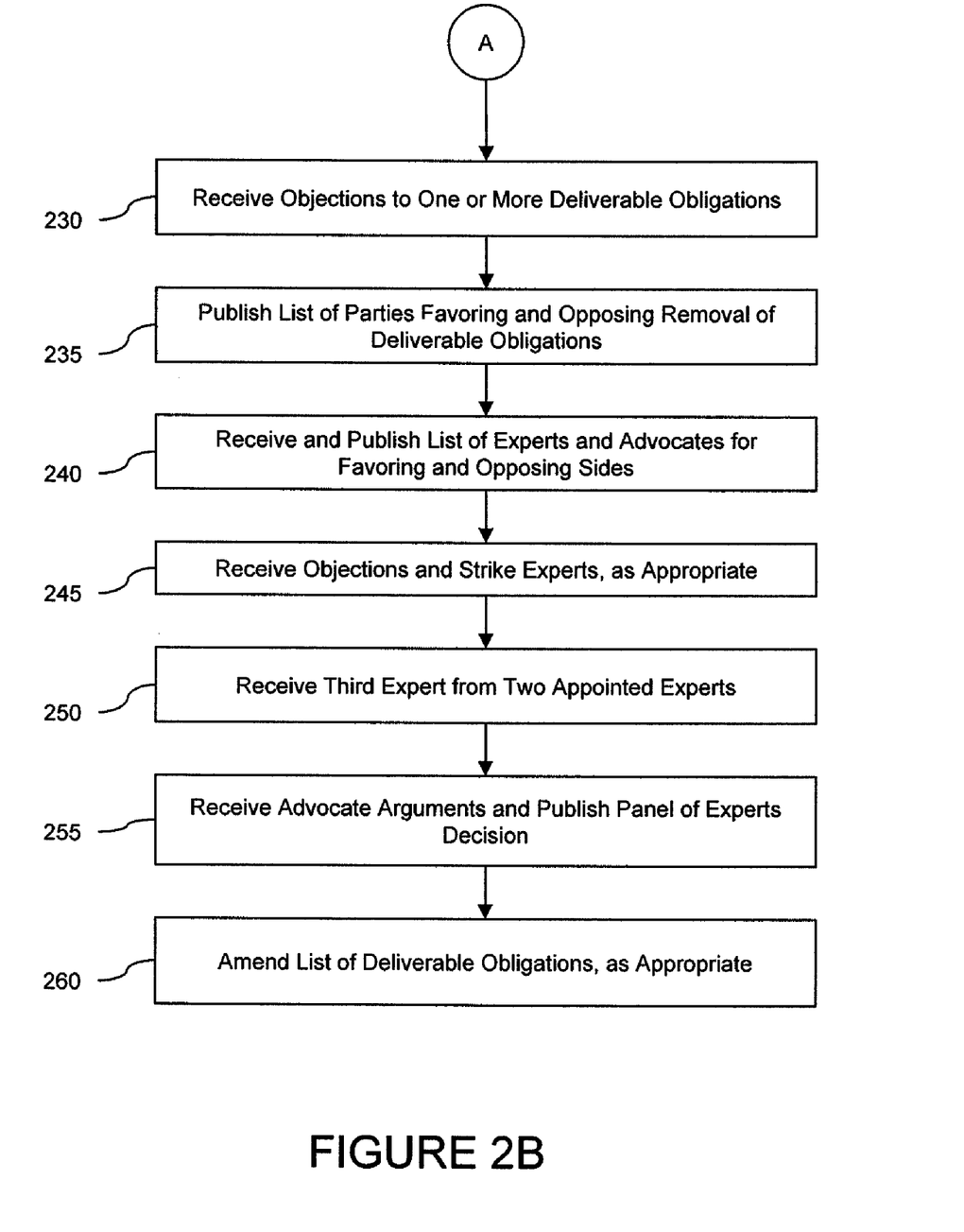

FIGS. 2A and 2B are flow diagrams of an exemplary method for selecting deliverable obligations (i.e., debt instruments) for an auction in accordance with the present invention. The method of FIG. 2 is performed by deliverable obligation list preparation and publishing logic 182, which can include logic for performing the acts of this method. Initially, requests for hosting an auction are received, and notice of the auction is posted (step 205). A decision of whether to host an auction can be performed by a committee of administrator 150, and the committee can select a protocol for the auction that sets forth the auction rules and delivery requirements.

Next, one or more requests to post a deliverable obligation are received (step 210), and after a predetermined period of time a list of deliverable obligations is published (step 215). Deliverable obligations are one or more different types of debt instruments that meet pre-determined criteria. Participants 105a-105d can request that a listing of one or more of the deliverable obligations be reviewed, and these requests are received by administrator 150 (step 220). This request can be provided at any point after administrator 150 posts the details of the proposed deliverable obligations, until a predetermined time, such as two business days before an auction cut-off date, and the request can be in writing. An arbiter, such as a law firm, can be appointed to review the deliverable obligation for inclusion in the auction, and once that review is complete, the analysis is shared with all participants (step 225). This initial review replaces the conventional dealer poll approach with one that provides any market participant the ability to have a voice in what should be subject to the auction, and also to flag any possible issues with deliverability under the terms of the auction protocols.

Referring now to FIG. 2B, if a participant is not satisfied with the results of this analysis, objections can be provided to the administrator (step 230). When one or more objections are received, a list of parties favoring and opposing removal of the objected to deliverable obligations is published (step 235). A list of experts and advocates for the favoring and opposing sides are received and published by administrator 150 (step 240). Each of the opposing sides can object to the experts, and as appropriate the experts can be stricken (step 245). Administrator 150 then receives a nomination of a third expert from the two appointed experts (step 250). After receiving advocate arguments and publishing the decision of the panel of experts (step 255), an amended list of deliverable obligations is published (step 260). The amended list includes all of the deliverable obligations that are subject to the auction.

Figure 3A:
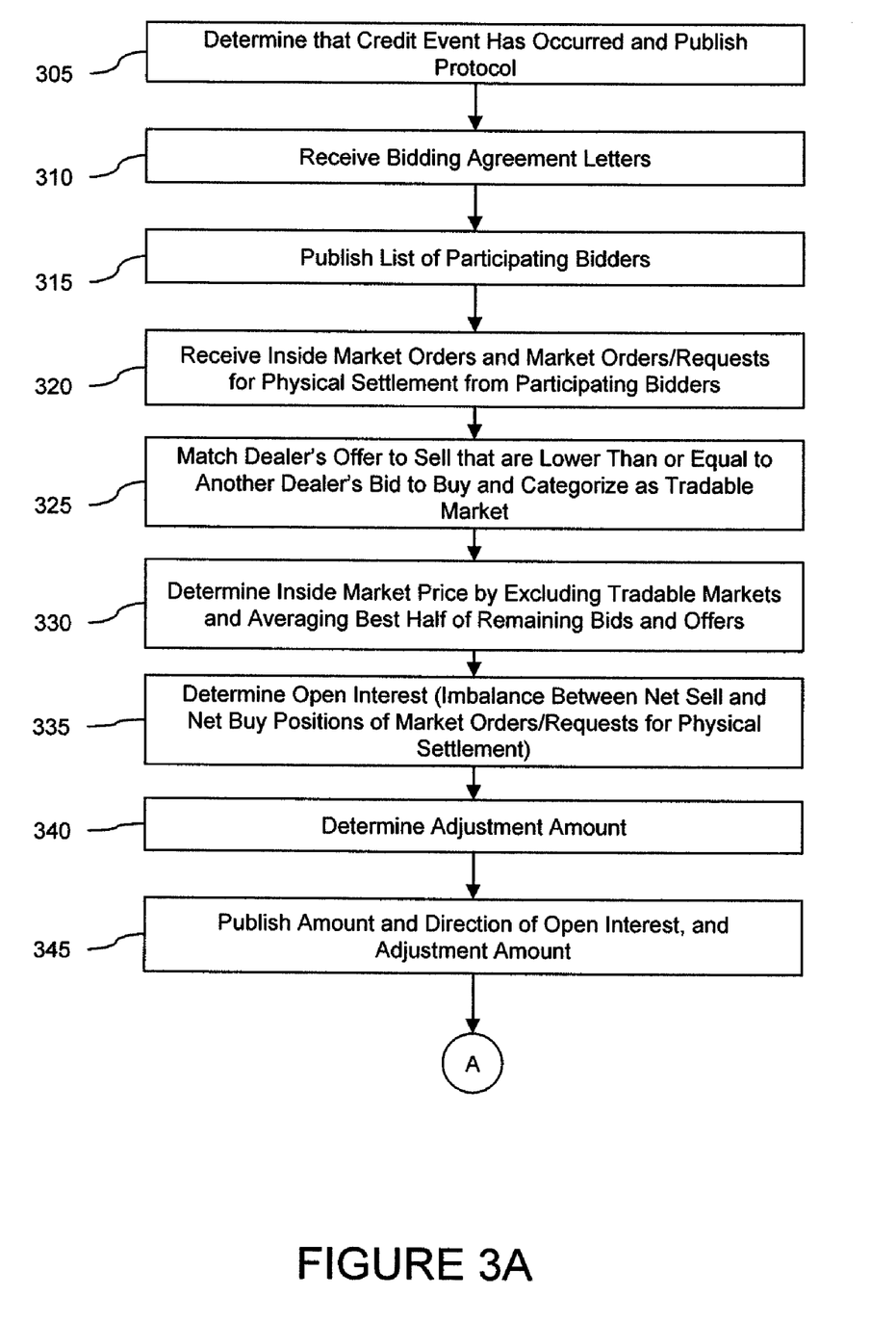
FIGS. 3A and 3B are flow diagrams of an exemplary auction method in accordance with the present invention.
Figure 3B:
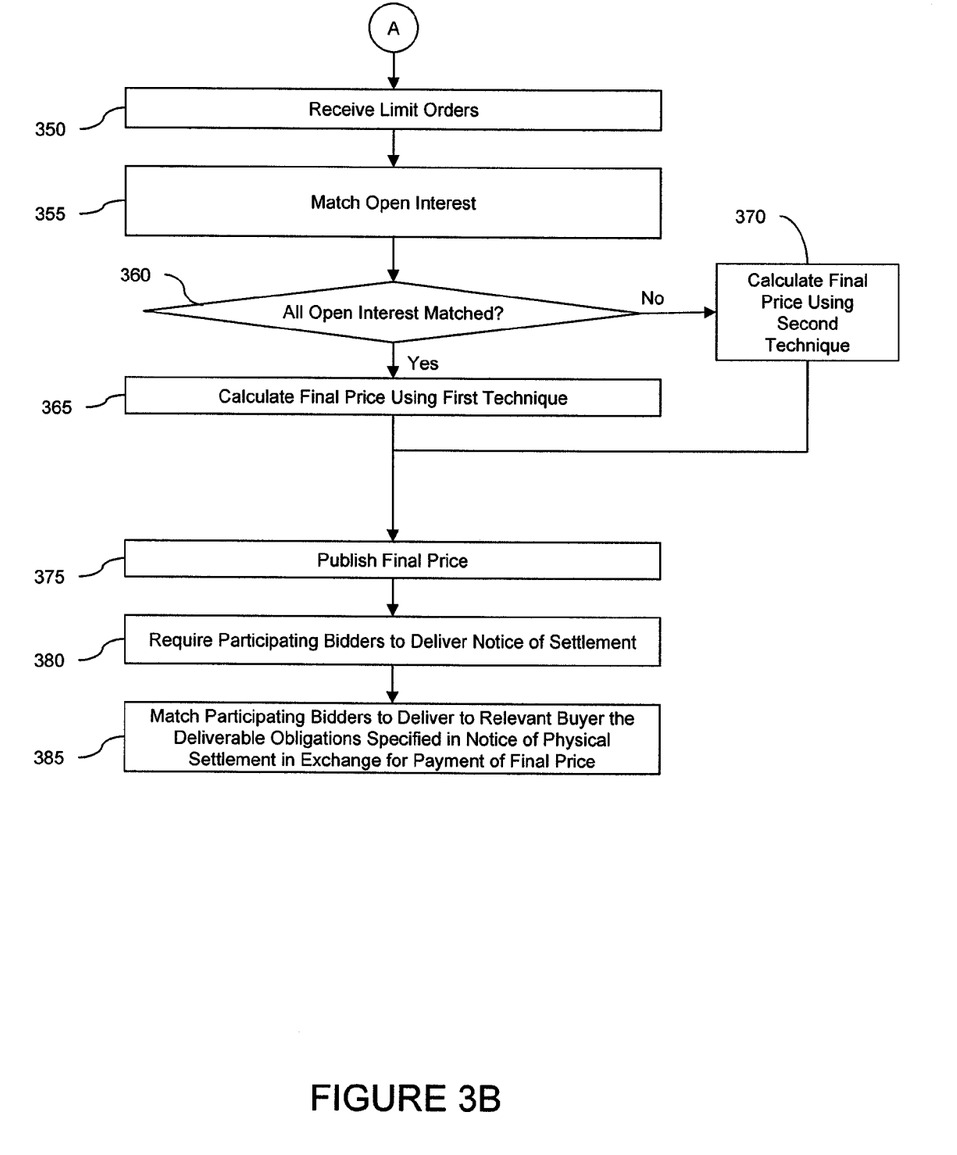

FIGS. 3A and 3B are flow diagrams of an exemplary auction method in accordance with the present invention. This method can be performed separately for each class of deliverable obligation from the final amended list. When it is determined that a credit event has occurred, the protocol for the credit event is published (step 305), and bidding agreement letters from participants 105a-105d are received (step 310). After a predetermined period of time, a list of participating bidders is published (step 315). Logic 170 then receives inside market orders and market orders/requests for physical settlement from participating bidders (step 320). The participating bidders are one or more of participants 105a-105d, acting on their own behalf or on behalf of their clients.

Inside market orders are matched pairs of bids and offers in a pre-determined size, for example, $10 million, and the matched pairs are not more than two percent of par apart from each other (these matched pairs are commonly referred to as 10×10's). Market orders/requests for physical settlement are orders to buy or sell debt instruments, which do not include a price, and instead are executed at the final price determined by the auction. In the method of FIG. 3, a participant that wants to physically settle its credit derivative trades submits a market order/request for physical settlement equal to its net position, whereas a participant that only wants to cash settle its position would not submit such a market order/request for physical settlement. This approach is an "open system" because the submission of market orders/requests for physical settlement is voluntary. Each non-participating bidder's market order/request for physical settlement may be any size up to its actual market position, and its market position is equal to the size of deliverable obligation purchases or sales that would cause the participant's risk position, after cash settlement of all of its credit default swap contracts with respect to the defaulted reference entity, to be the same as its position would have been had such swaps been physically settled.

For example, if a participant's net credit default swap position was as a protection buyer of $10 million in credit protection on the defaulted reference entity, the participant's market position would be as a seller of $10 million in deliverable obligations of the defaulted reference entity. This is because, without the cash settlement of its trades under the auction, the participant would have had to have been holding $10 million in deliverable obligations to be delivered to settle its positions. As those positions will now be cash settled, that participant must now sell those $10 million in deliverable obligations in order to maintain the same risk position.

If the participant is a net protection seller, the participant will be on the buy side because buying the debt instrument and paying a loss amount in cash settlement will be economically equivalent to receiving the debt instrument and paying the par value. For example, if a debt instrument that defaults is now worth 40 cents on the dollar, that debt instrument would be purchased for 40 cents on the dollar. When combined with the settlement amount of 60 cents on the dollar, the participant is in the equivalent position of being delivered the debt instrument and paying 100 cents on the dollar.

Figure 4A:
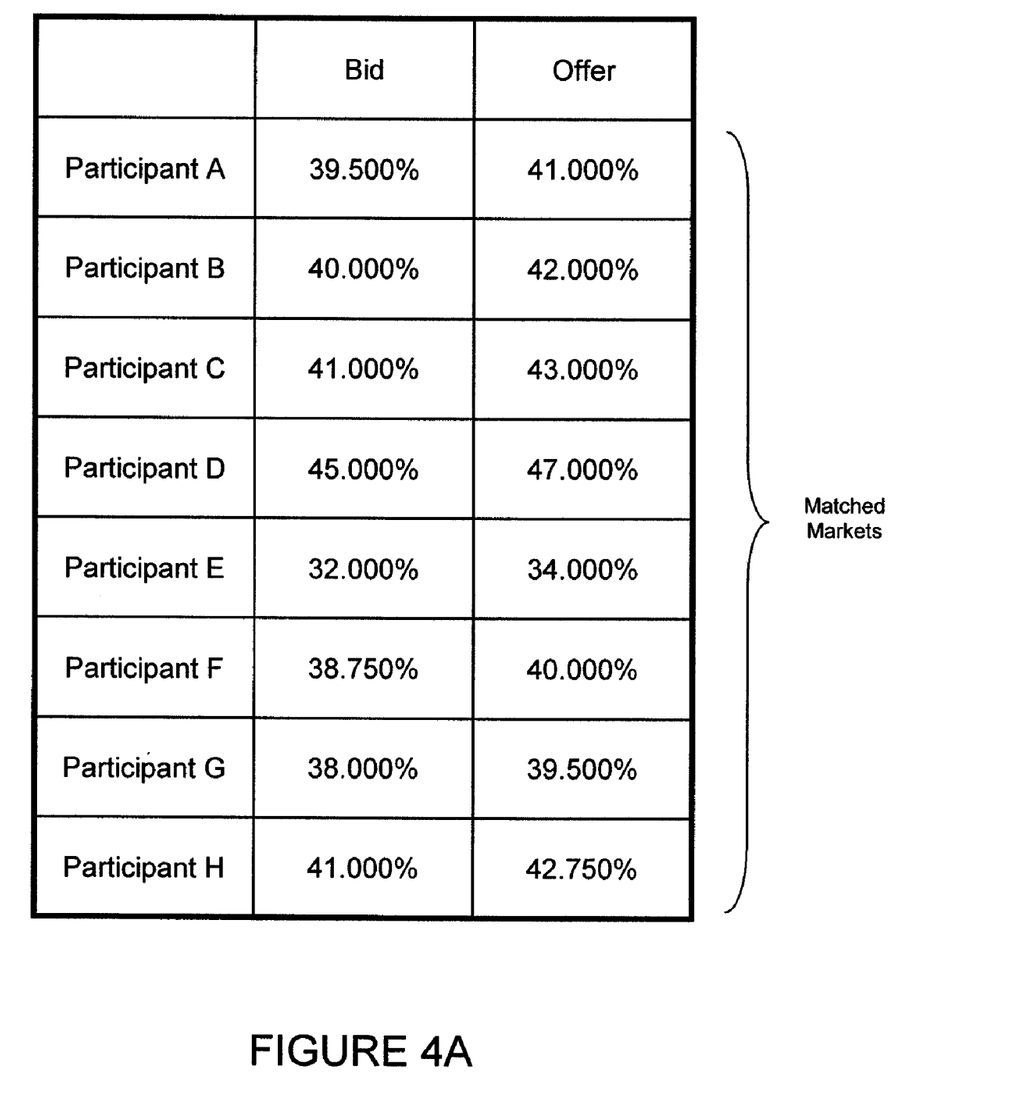
FIGS. 4A-4C illustrate exemplary bids and offers which are contributed, sorted and used to determine an inside market midpoint.
Figure 4B:
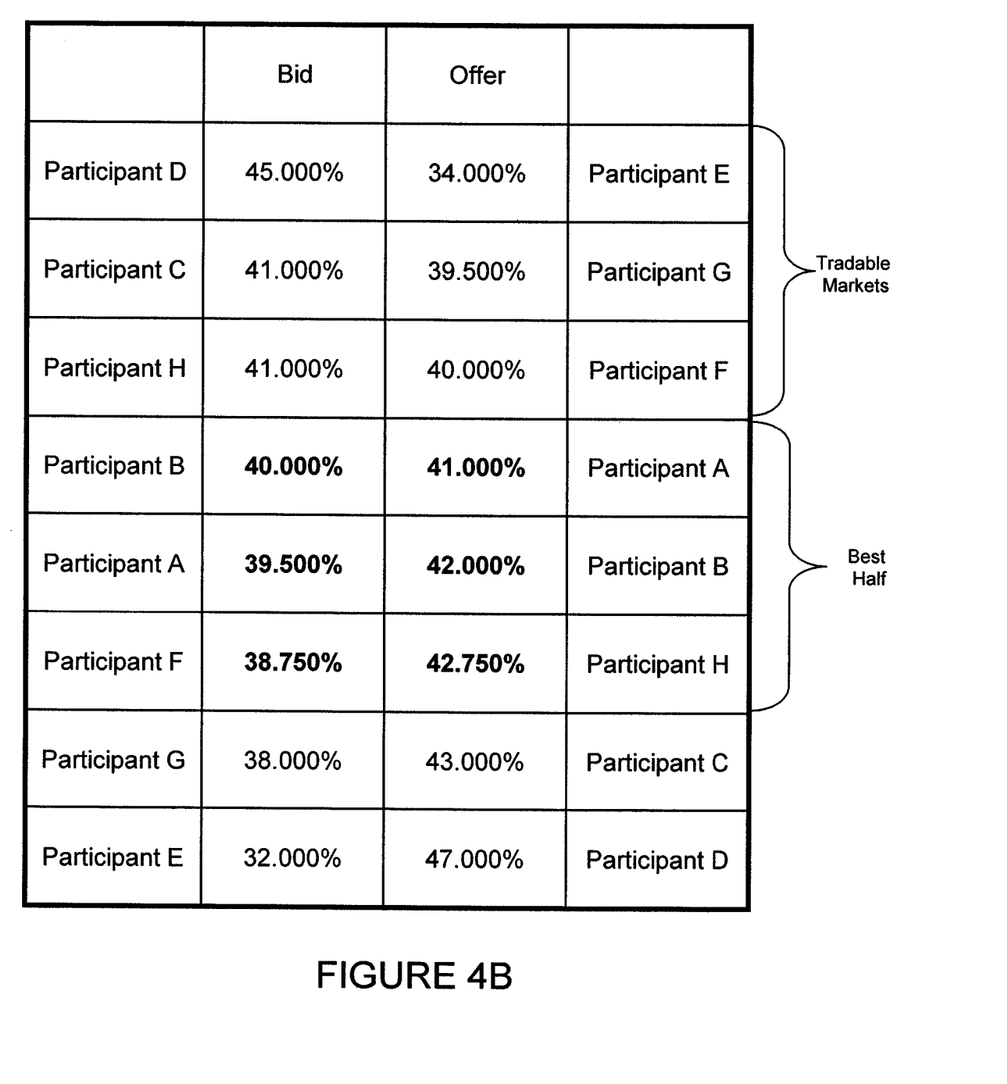
Figure 4C:
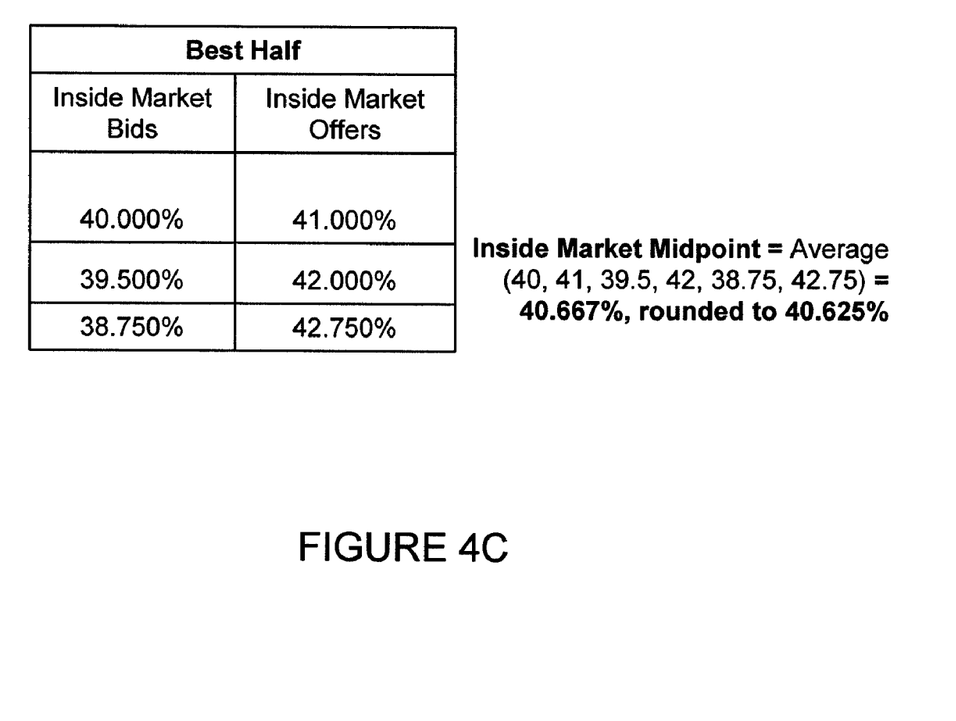

Returning to FIG. 3A, logic 172 then matches offers to sell that are lower than or equal to another bid to buy and categorizes these matches as tradable markets (step 325). FIG. 4A illustrates the inside market orders received from participating bidders, and FIG. 4B illustrates the order sorted such that the tradable markets are identified. Logic 172 then determines the inside market midpoint by excluding the tradable markets and averaging the best half of the remaining bids and offers (step 330). FIG. 4B also illustrates the best half of the remaining bids and offers that are used to calculate the inside market midpoint, and this calculation is illustrated in FIG. 4C. Logic 174 then determines the open interest, i.e., the imbalance between net sell and net buy positions of the market orders/requests for physical settlement (step 335), and any adjustment amount payable in respect of a tradable market is determined by logic 176 (step 340).

Figure 5A:
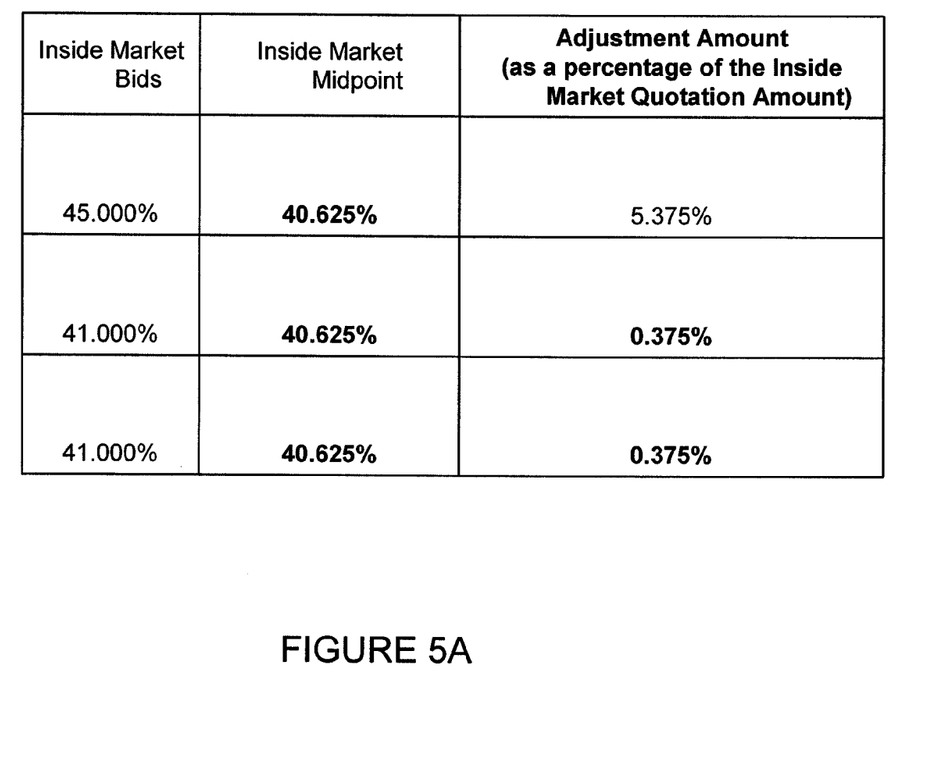
FIGS. 5A and 5B are tables illustrating exemplary adjustment amounts in accordance with the present invention.
Figure 5B:
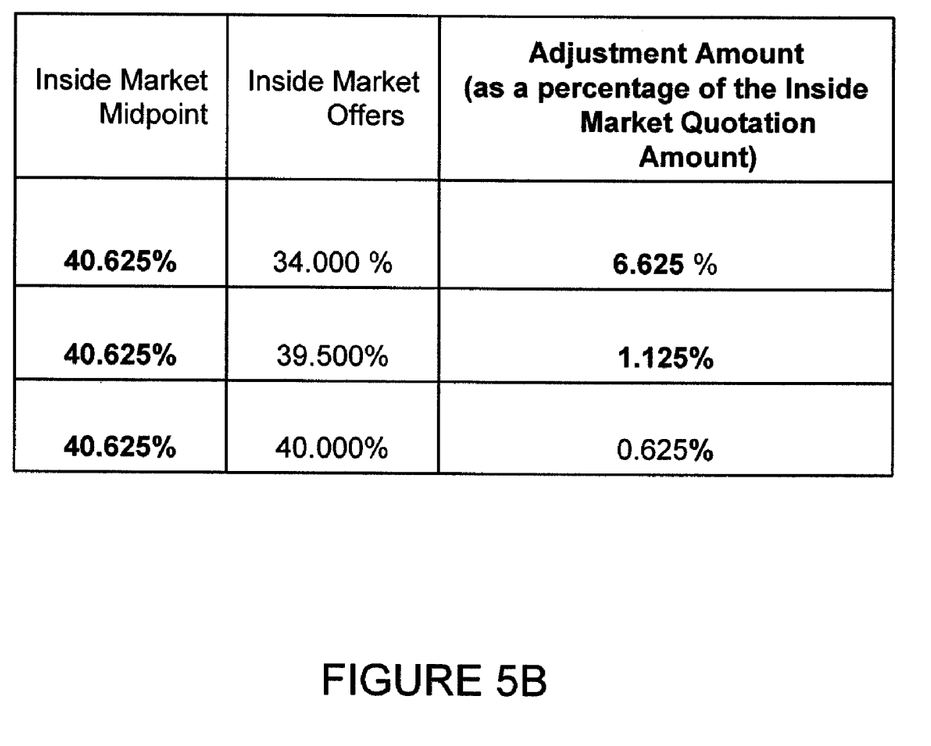

FIGS. 5A and 5B are tables illustrating the calculation of any adjustment amount payable in respect of a tradable market. Specifically, FIG. 5A illustrates the adjustment amount when the open interest is an offer to buy deliverable obligations, and FIG. 5B illustrates the adjustment amount when the open interest is an offer to sell deliverable obligations. When the open interest is an offer to sell deliverable obligations, logic 176 determines the adjustment amount as the greater of (a) zero and (b) the inside market bid forming part of the tradable market minus the inside market midpoint, multiplied by the inside market quotation amount, and determines that such amount will be payable by the participant who submitted the inside market bid forming part of the tradable market. When the open interest is a bid to purchase deliverable obligations, logic 176 determines the adjustment amount as the greater of (a) zero and (b) the inside market midpoint minus the inside market offer forming the tradable market, multiplied by the inside market quotation amount, and determines that such amount will be payable by the participant who submitted the inside market offer forming part of the tradable market.

Logic 174 publishes the size and direction of the open interest, as well as the adjustment amount (step 345). The size of the open interest is the difference between market orders/requests for physical settlement to buy and market orders/requests for physical settlement to sell. The direction of the open interest indicates whether the open interest is a net buy or net sell. If all market participants submit their precise market positions as market orders/requests for physical settlement, these positions would net to zero and the auction would settle at the inside market midpoint, which is essentially a dealer poll of the market prior to the publication of the open interest. However; it is likely that participants may submit market orders/requests for physical settlement for less than their market position, and the market orders/requests for physical settlement will likely not net to zero and additional limit bids and offers are necessary to fill the open interest.

Figure 6:
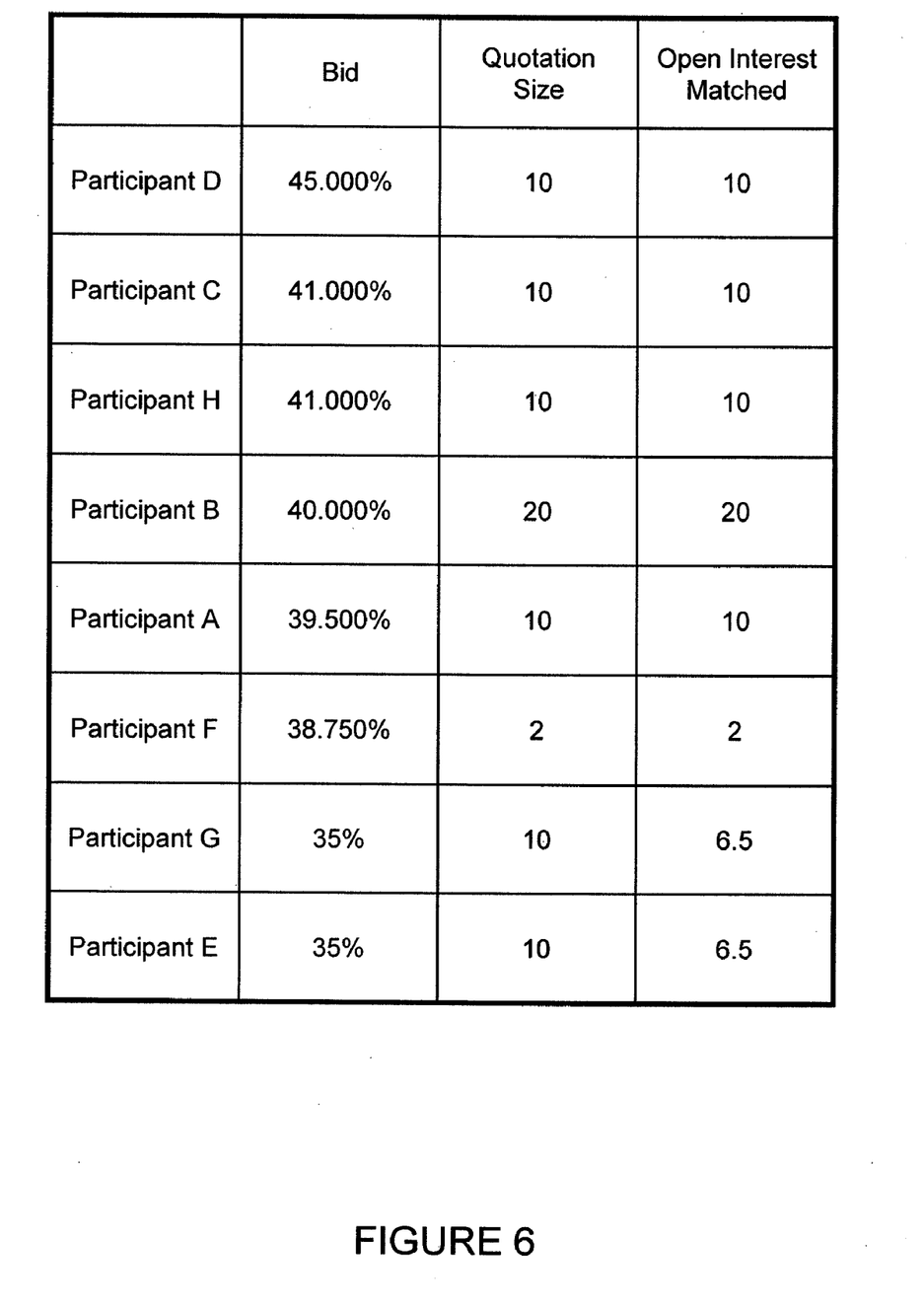
FIG. 6 is a table illustrating the matching of limit bids submitted to the open interest.

When there is an imbalance between net buy and net sell positions, the second stage of the auction is performed. Specifically, for a predetermined period of time limit orders are received (step 350), and the open interest is matched to the received limit orders (step 355). Depending upon whether all of the open interest has been matched (step 360), one of two techniques are used to calculate the final price (steps 365 or 370). When all of the open interest has been matched ("Yes" path out of decision step 360), then logic 180 calculates the final price by finding the highest bid or lowest offer among limit orders of which the entire open interest is fulfilled (step 365). When there are two or more highest bids or lowest offers of which the entire open interest is fulfilled, these bids or offers are fulfilled on a pro rata basis. Referring now to FIG. 6, an example is illustrated in which the open interest is an offer to sell of 75 and the final price is 35% because that is the last highest bid among the limit order of which the entire open interest is fulfilled, and because there are two bids at this percentage they are fulfilled on a pro rata basis from the remaining open interest after all of the other orders are fulfilled.

When not all of the open interest has been matched ("No" path out of decision step 360), then logic 180 calculates the final price using the second technique (step 370). In the second technique, if the open interest is a bid to purchase deliverable obligations, then the final price is set equal to the face value of the deliverable obligation, and if the open interest is an offer to sell deliverable obligations, then the final price is set equal to zero.

Logic 180 then publishes the final price (step 375), and administrator 150 requires the participating bidders to deliver notice of settlement (step 380). Logic 178 matches participating bidders to deliver to relevant buyers the deliverable obligations specified in the notice of physical settlement in exchange for payment of the final price (step 385). In other words, the limit orders that are matched with the open interest are executed at the final price, and not the price specified in the limit order.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of settling credit default swap contracts, the method comprising acts of:

receiving, by an administrator processor from a plurality of participant computers, market orders/requests for physical settlement of a deliverable obligation for the credit default swap contracts;

determining, by the administrator processor, an imbalance between net sell and net buy positions for the deliverable obligation for the credit default swap contracts based on the received market orders/requests for physical settlement of the deliverable obligation;

receiving, by the administrator processor, limit orders; and determining, by the administrator processor, whether there is an imbalance between net sell and net buy positions for the deliverable obligation for the credit default swap contracts based on the received limit orders, wherein when the imbalance between the net sell and the net buy positions for the deliverable obligation for the credit default swap contracts is not satisfied based on the received limit orders, the method comprises acts of:

determining whether the imbalance is an offer to sell the deliverable obligation or a bid to buy the deliverable obligation; and determining a final price for the deliverable obligation, the final price determined by setting a price for the deliverable obligation that is face value of the deliverable obligation when the imbalance is a bid to purchase the deliverable obligation; and setting a price for the deliverable obligation to zero when the imbalance is an offer to sell the deliverable obligation.

2. The method of claim 1, wherein when the imbalance between the net sell and the net buy positions for the deliverable obligation for the credit default swap contracts is satisfied based on the received limit orders, the method comprising an act of:
determining a final price as a highest bid or a lowest offer at which the imbalance is fulfilled.

3. The method of claim 1, wherein the method includes a first stage and a second stage, wherein the imbalance is settled in the second stage, wherein the market orders/requests for physical settlement are received during the first stage, wherein the limit orders are received during the second stage, and wherein the market orders/requests for physical settlement are executed at a final price determined during the second stage.

4. The method of claim 1, further comprising an act of:
publishing a size and a direction of the imbalance prior to attempting to settle the imbalance.

5. The method of claim 1, wherein the acts are performed after an entity associated with the credit default swap contracts has filed for bankruptcy, failed to pay an amount due on a debt instrument or restructured a debt instrument.

6. The method of claim 1, wherein the method is performed for each of a plurality of debt instruments associated with an entity.

7. The method of claim 1, further comprising acts of:
receiving a request to host an auction; and
posting a notice of the auction.

8. The method of claim 7, further comprising acts of:
preparing and publishing a list of deliverable obligations associated with a credit event;
receiving and evaluating objections to one of the deliverable obligations in the list of deliverable obligations; and
preparing and publishing an amended list of deliverable obligations based on the objections.

9. A system of settling credit default swap contracts, the system comprising:
a plurality of participant computers; and
an administrator computer comprising:
an interface arranged to interface with the plurality of participant computers;
a memory; and
a processor, coupled to the interface and the memory, wherein the processor comprises:
an imbalance determination logic that determines an imbalance between net sell and net buy positions for a deliverable obligation for the credit default swap contracts based on received market orders/requests for physical settlement of the deliverable obligation; and
an imbalance settling logic that determines whether there is an imbalance between net sell and net buy positions for deliverable obligation for the credit default swap contracts based on limit orders, wherein when the imbalance between the net sell and the net buy positions for deliverable obligation for the credit default swap contracts is not satisfied based on the received limit orders, the imbalance settling logic determining whether the imbalance is an offer to sell the deliverable obligation or a bid to buy the deliverable obligation and determining a final price for the deliverable obligation, the final price determined by
setting a price for the deliverable obligation that is face value of the deliverable obligation when the imbalance is a bid to purchase the deliverable obligation; and
setting a price for the deliverable obligation to zero when the imbalance is an offer to sell the deliverable obligation.

10. The system of claim 9, wherein when the imbalance between the net sell and the net buy positions for the deliverable obligation for the credit default swap contracts is satisfied based on the received limit orders, the imbalance settling logic determining a final price as a highest bid or a lowest offer at which the imbalance is fulfilled.

11. The system of claim 9, wherein the system provides a two stage auction that includes a first stage and a second stage, wherein in which the imbalance is settled in the second stage, wherein the market orders/requests for physical settlement are received during the first stage, wherein the limit orders are received during the second stage, and wherein the market orders/requests for physical settlement are executed at a final price determined during the second stage.

12. The system of claim 9, wherein a size and a direction of the imbalance is published prior to attempting to settle the imbalance.

13. The system of claim 9, wherein the administrator receives a request to host an auction from one of the plurality of participant computers, and the administrator posts a notice of the auction.

14. The system of claim 13, further comprising logic arranged to
prepare and publish a list of deliverable obligations associated with a credit event;
receive and evaluate objections to one of the deliverable obligations in the list of deliverable obligations; and
prepare and publish an amended list of deliverable obligations based on the objections.

15. The system of claim 9, wherein the system is employed for each of a plurality of debt instruments associated with an entity.

* * * * *